United States Patent

Genier

(10) Patent No.: US 8,998,471 B2
(45) Date of Patent: Apr. 7, 2015

(54) LIGHTING UNITS HAVING LIGHT-DIFFUSING OPTICAL FIBER

(71) Applicant: Corning Incorporated, Corning, NY (US)

(72) Inventor: Michael Lucien Genier, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/012,013

(22) Filed: Aug. 28, 2013

(65) Prior Publication Data

US 2015/0062956 A1    Mar. 5, 2015

(51) Int. Cl.
*F21V 8/00* (2006.01)
*G02B 6/04* (2006.01)

(52) U.S. Cl.
CPC ............ *G02B 6/0006* (2013.01); *G02B 6/0008* (2013.01); *G02B 6/04* (2013.01)

(58) Field of Classification Search
USPC .............. 362/97.1, 97.2, 97.3, 554, 555, 556, 362/611, 613
See application file for complete search history.

(56) References Cited

U.S. PATENT DOCUMENTS

| | | | |
|---|---|---|---|
| 4,885,663 A | 12/1989 | Parker | |
| 7,357,548 B2 * | 4/2008 | Haenen et al. | 362/551 |
| 7,654,717 B2 * | 2/2010 | Trujillo | 362/576 |
| 8,300,174 B2 | 10/2012 | Takata | |
| 2003/0214812 A1 | 11/2003 | Bourdelais et al. | |
| 2004/0174715 A1 * | 9/2004 | Page et al. | 362/554 |
| 2008/0025039 A1 * | 1/2008 | Guillermo | 362/556 |
| 2009/0010019 A1 * | 1/2009 | Ashoff | 362/554 |
| 2009/0122560 A1 | 5/2009 | Bingham | |
| 2010/0046246 A1 * | 2/2010 | Bihr et al. | 362/556 |
| 2010/0110719 A1 | 5/2010 | Booth | |
| 2012/0275178 A1 | 11/2012 | Logunov | |
| 2013/0156392 A1 | 6/2013 | Logunov et al. | |

FOREIGN PATENT DOCUMENTS

| | | |
|---|---|---|
| DE | 102008034791 | 1/2008 |
| FR | 2979412 | 3/2013 |
| GB | 2046466 | 11/1980 |

* cited by examiner

*Primary Examiner* — Laura Tso
(74) *Attorney, Agent, or Firm* — Svetlana Short

(57) ABSTRACT

Lighting units include a light source, a light-diffusing optical fiber assembly, and a support substrate. The light-diffusing optical fiber assembly includes a plurality of light-diffusing optical fibers that are arranged in a bundled portion surrounded by a jacket and a splayed portion free from the jacket. The plurality of light-diffusing optical fibers in the splayed portion scatter light optically coupled into the plurality of light-diffusing optical fibers from the light source. The plurality of light-diffusing optical fibers within the splayed portion are structurally coupled to the support substrate.

37 Claims, 12 Drawing Sheets

LIGHTING UNITS HAVING LIGHT-DIFFUSING OPTICAL FIBER

TECHNICAL FIELD

The present specification generally relates to lighting units having light-diffusing optical fiber.

BACKGROUND

Lighting fixtures conventionally incorporate light sources including, for example, incandescent light bulbs, halogen light bulbs, compact fluorescent bulbs, and light emitting diodes (LEDs) that are positioned within the lighting fixture to provide an illumination light source. In some end-user applications for the lighting fixture, the light source may not provide the desired quality of light. For example, for lighting fixtures that incorporate LEDs as light sources, the LEDs have high directionality in the light emitted and may cause glare when viewed without shielding. To reduce the effects of directionality and glare, an increased number of LEDs that operate with lower brightness per LED may be positioned within the light source. Alternatively, or in addition, a light diffusing element may be positioned proximate to the LEDs to diffuse the light emitted, thereby reducing the intensity of individual LEDs. However, these additions may increase the cost of the light source and/or increase mechanical and thermal complexity of the light source.

Accordingly, alternative lighting units may be desired.

SUMMARY

In one embodiment, a lighting unit includes a light source, a light-diffusing optical fiber assembly, and a support substrate. The light-diffusing optical fiber assembly includes a plurality of light-diffusing optical fibers that are arranged in a bundled portion surrounded by a jacket and a splayed portion free from the jacket. The plurality of light-diffusing optical fibers in the splayed portion scatter light optically coupled into the plurality of light-diffusing optical fibers from the light source. The plurality of light-diffusing optical fibers within the splayed portion are structurally coupled to the support substrate.

In another embodiment, a lighting unit includes a light source, a light-diffusing optical fiber assembly, and a support substrate. The light-diffusing optical fiber assembly includes a plurality of light-diffusing optical fibers that are arranged in a bundled portion and a splayed portion. The plurality of light-diffusing optical fibers in the splayed portion scatter light optically coupled into the plurality of light-diffusing optical fibers from the light source. At least a portion of the plurality of light-diffusing optical fibers within the splayed portion are embedded within the support substrate.

In yet another embodiment, a lighting unit includes a light source and a light-diffusing optical fiber assembly that includes a plurality of light-diffusing optical fibers that are arranged in a bundled portion and a splayed portion. The plurality of light-diffusing optical fibers in the splayed portion scatter light optically coupled into the plurality of light-diffusing optical fibers from the light source. A splayed packing ratio evaluated at a circumscribing diameter that surrounds the light-diffusing optical fibers in the splayed portion comparing an area of the collective light-diffusing optical fibers to an area of the circumscribing diameter is greater than a bundled packing ratio evaluated at a diameter circumscribing the light-diffusing optical fibers in the bundled portion.

Additional features and advantages of the embodiments described herein will be set forth in the detailed description which follows, and in part will be readily apparent to those skilled in the art from that description or recognized by practicing the embodiments described herein, including the detailed description that follows, the claims, as well as the appended drawings.

It should be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
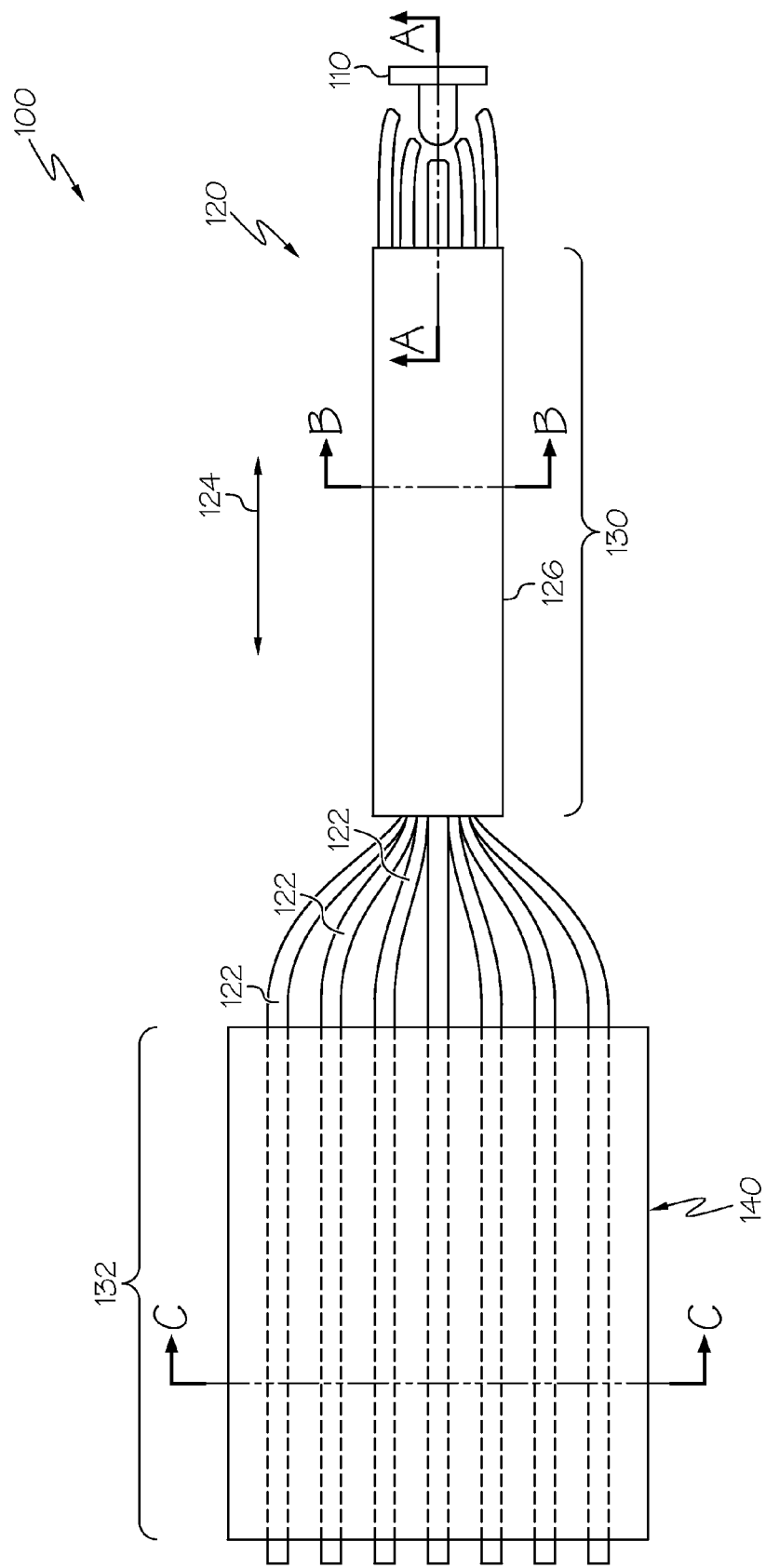
FIG. 1 schematically depicts a side view of a lighting unit incorporating a lighting unit having light-diffusing optical fiber according to one or more embodiments shown or described herein.

Reference will now be made in detail to embodiments of lighting units and light fixtures incorporating lighting units having light-diffusing optical fiber that scatters light to the surrounding environment. One embodiment of a lighting unit incorporating light diffusing fiber is generally depicted in FIG. 1. The lighting unit generally includes a light source optically coupled to a light-diffusing optical fiber assembly. The light-diffusing optical fiber assembly includes a plurality of light-diffusing optical fibers that are arranged into a bundled portion that is surrounded by a jacket and a splayed portion that is free from the jacket. The portions of the light-diffusing optical fibers that are positioned in the splayed portion are spaced apart from one another to direct the light provided by the light source into the surrounding environment. The portions of the light-diffusing optical fibers within the splayed portion may be arranged to provide light into the surrounding environment with a shape and position as desired. The portions of the light-diffusing optical fiber positioned in the splayed portion may be structurally coupled to a support surface to provide resilient positioning of the light-diffusing optical fiber. These and other embodiments will be described in more detail with reference to the appended figures.

Referring in detail to FIG. 1, a lighting unit 100 is depicted. In this embodiment, the lighting unit 100 includes a light source 110, a light-diffusing optical fiber assembly 120, and a support substrate 140. The light-diffusing optical fiber assembly 120 includes a plurality of light-diffusing optical fibers 122 that are optically coupled to the light source 110. Light emitted by the light source 110 is introduced to the light-diffusing optical fibers 122. Light is transmitted along the light-diffusing optical fibers 122 along the axial direction 124 of the optical fibers and is diffused out of the light-diffusing fibers 122 in directions transverse to the axial direction 124.

The plurality of light-diffusing optical fibers 122 may be arranged in a variety of configurations to introduce light that is emitted by the light source 110 into the environment surrounding the light-diffusing optical fibers 122. The light-diffusing optical fibers 122 may be positioned in bundled portions 130 in which the plurality of light-diffusing optical fibers 122 are closely spaced relative to one another, and in splayed portions 132 in which the plurality of light-diffusing optical fibers 122 are widely spaced relative to one another. In the embodiment depicted in FIG. 1, the bundled portions 130 of the plurality of light-diffusing optical fibers 122 is surrounded by a jacket 126. At positions spaced apart from the bundled portions 130, the plurality of light-diffusing optical fibers 122 may be free from the jacket 126. At positions free from the jacket 126, the plurality of light-diffusing optical fibers 122 may be spaced apart from one another. The plurality of light-diffusing optical fibers 122 may be positioned into the splayed portion 132, where the plurality of light-diffusing optical fibers 122 are generally widely spaced relative to one another so that light emitted by the plurality of light-diffusing optical fibers 122 can be projected into the surrounding environment with a desired intensity and shape. In the embodiment depicted in FIG. 1, the splayed portion 132 of the light-diffusing optical fibers 122 are structurally coupled to a support substrate 140. The support substrate 140 maintains the position of the light-diffusing optical fibers 122 in a predetermined configuration. The support substrate 140, and therefore the plurality of light-diffusing optical fibers 122 in the splayed portion 132, may be positioned within the surrounding environment to emit light in desired locations.

As used herein, the term "light" refers to electromagnetic radiation. In various embodiments, light emitted, captured, transmitted, and diffused according to the present disclosure may be within a variety of wavelengths including being in an ultraviolet range, a visible range, and/or an infrared range. As discussed hereinabove, the lighting unit 100 includes a plurality of light-diffusing optical fibers 122. The term "light-diffusing" means that light scattering is substantially spatially continuous along at least a portion of the length of the light-diffusing optical fiber 122, i.e., there are no substantial jumps or discontinuities such as those associated with discrete (e.g., point) scattering. Thus, the concept of substantially continuous light emission or substantially continuous light scattering as set forth in the present disclosure refers to spatial continuity.

Figure 2:
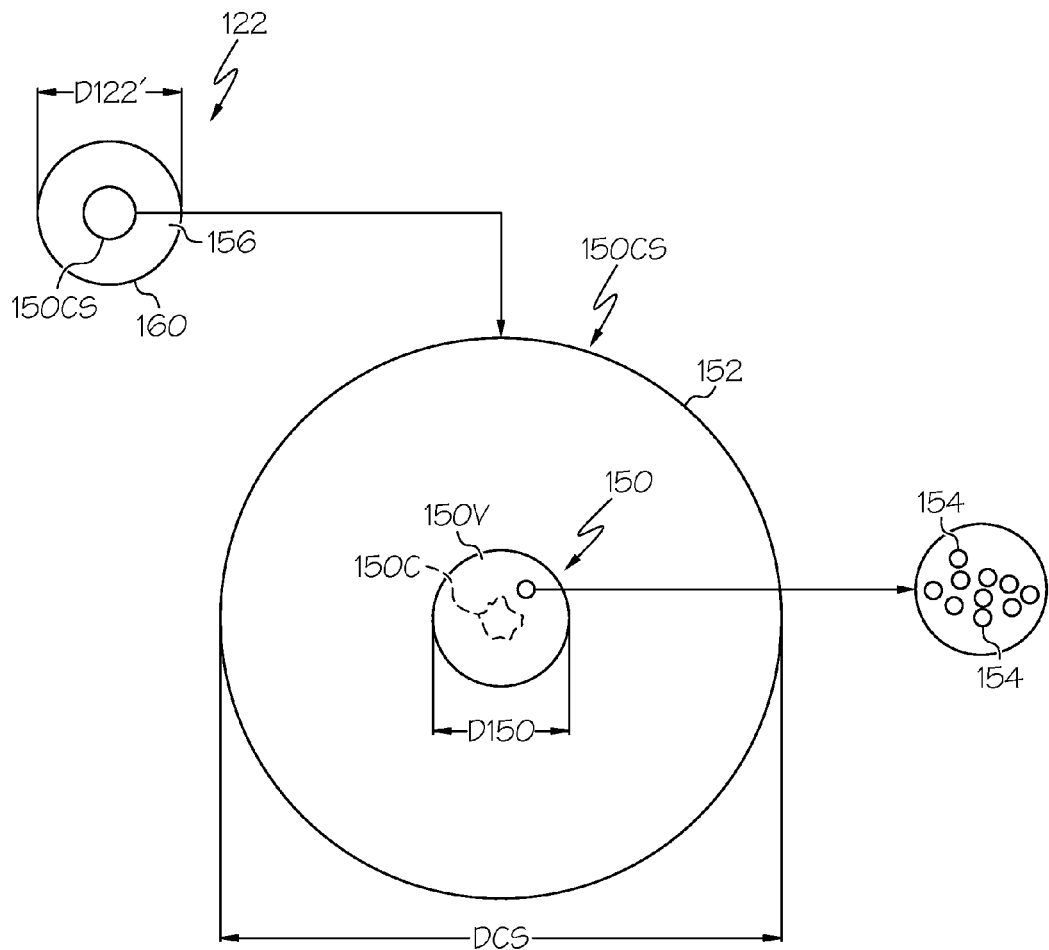
FIG. 2 schematically depicts a front sectional view of a light-diffusing optical fiber according to one or more embodiments shown or described herein.

FIG. 2 is a cross-sectional view of an example light-diffusing optical fiber 122 having a central core section ("core") 150CS, and an outer cladding 156, and showing in detail an example configuration for the core. Light-diffusing optical fiber 122 includes a center (or inner) core region 150 having a diameter D150, and an outer core region 152 that at least partially surrounds the center core region 150. The center core region 150 includes a central clear (solid) region 150C surrounded by an annular void region 150V that includes randomly arranged and randomly sized voids 154, as illustrated in the lower inset of FIG. 2. In other embodiments, the portions of the light-diffusing optical fiber that scatter light into the surrounding environment may be completely filled (not shown). Light-diffusing optical fiber 122 also includes a cladding region 156 that surrounds core 150CS. In an example, cladding region 156 is made of low-index polymer while core 150CS comprises silica. The light-diffusing optical fiber 122 may also include a light scattering layer 160 positioned around the cladding region 156. The light scattering layer 160 may include a variety of phosphor materials that interact with the light scattered by the light-diffusing optical fiber 122 to modify the light, as discussed in further detail below.

Examples of light-diffusing optical fibers having randomly arranged and randomly sized voids 154 (also referred to as "random air lines" or "nanostructures" or "nano-sized structures") are described in U.S. Pat. No. 7,450,806, and in U.S. Patent Publication No. 2011/0122646, which patent and patent publication are incorporated by reference herein.

In an example, central clear region 150C of the light-diffusing optical fiber 122 has a nominal refractive index $n_{122}$ of about 1.46 at a wavelength of 550 nm. Also in an example, core diameter DCS is in the range from about 125 microns to 300 microns. Further in an example, the diameter D122 of light-diffusing optical fiber 122 is in the range from 0.2 mm (200 microns) to 0.6 mm (600 microns).

Light-diffusing optical fiber 122 can have a loss due to scattering that varies from 0.2 to 60 dB/m, depending on the particular configuration of center core region 150 and outer core region 152. However, as described in greater detail below, embodiments according to the present disclosure involve modifying the light-diffusing optical fiber 122 to obtain a greater loss, e.g., up to about 60 dB/m. Thus, in an example, light-diffusing optical fiber 122 can have a loss in the range from about 0.2 dB/m to about 60 dB/m, wherein the loss is substantially spectrally uniform in the wavelength range from 250 nm to 2,000 nm and, in another example, is substantially spectrally uniform over the visible wavelength or "white light" spectral range (e.g., nominally from 380 nm to 750 nm).

The light-diffusing optical fiber 122 may further include a coating layer, such as acrylate polymer material, that surrounds the cladding 156. The light-diffusing optical fiber 122 may also include a light scattering layer 160 that surrounds the coating layer. The light scattering layer 160 may include a light scattering material, for example, any solid particle, liquid droplet or gas bubble, or combination thereof, sized to scatter light. Specific examples of light scattering materials include phosphorous, $TiO_2$ particles, and doped polymers, such as white acrylate inks, for efficient scattering in angular space (i.e., uniform angular scattering).

Figure 3:
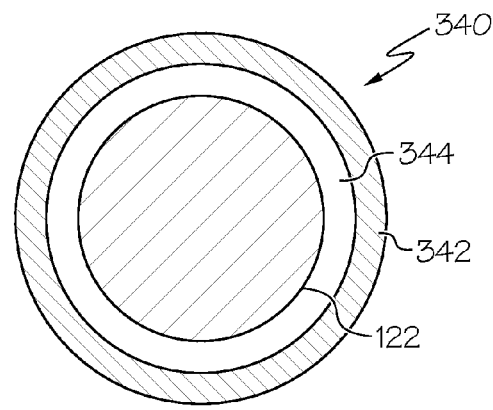
FIG. 3 schematically depicts a front sectional view of a light-diffusing optical fiber according to one or more embodiments shown or described herein.

Referring now to FIG. 3, each of the light-diffusing optical fibers 122 may be incorporated into an optical fiber run 340 that includes the light-diffusing optical fiber 122 surrounded by a skin 342. In some embodiments, the skin 342 may be transparent or translucent, so that light emitted by the light-diffusing optical fiber 122 is transmitted in substantial portion through the skin 342. In some embodiments, the skin 342 may contact the light-diffusing optical fiber 122. In other embodiments, the skin 342 may be spaced apart from the light-diffusing optical fiber 122 in radial orientations so that a gap 344 is maintained between the skin 342 and the light-diffusing optical fiber 122. In some embodiments, the skin 342 may include phosphors that modify the color temperature of the light emitted by the light-diffusing optical fiber 122 so that the light diffused by the light-diffusing optical fiber 122 into the surrounding environment has a different color cast than the light emitted by the light source 110.

Figure 4:
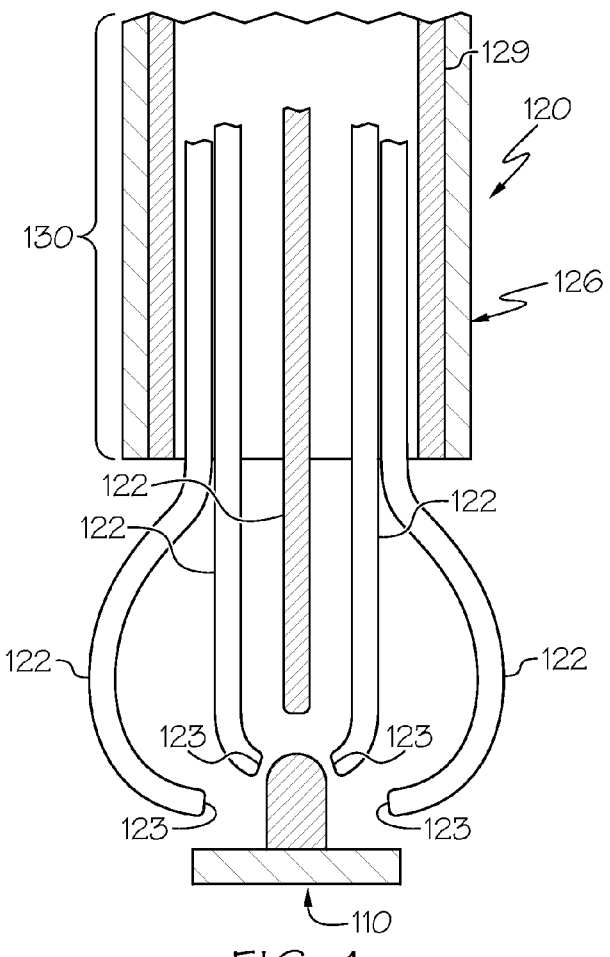
FIG. 4 schematically depicts a side sectional view of a lighting unit shown along line A-A of FIG. 1 according to one or more embodiments shown or described herein.

Referring now to FIG. 4, the bundled portion 130 of lighting unit 100 according to one embodiment is depicted. In this embodiment, the bundled portion 130 includes the plurality of light-diffusing optical fibers 122 that are surrounded by the jacket 126. The ends 123 of the light-diffusing optical fibers 122 may be positioned proximate to the light source 110 so that light emitted by the light source 110 is at least partially captured by the light-diffusing optical fibers 122. The emitted light captured by the light-diffusing optical fibers 122 may be at least partially transmitted along the length of the light-diffusing optical fibers 122, away from the bundled portion 130 towards the splayed portion 132 (as shown in FIG. 1). In the depicted embodiment, the ends 123 of the light-diffusing optical fibers 122 are positioned to be generally orthogonal to the light source 110 so that light emitted by the light source 110 can be efficiently captured by the light-diffusing optical fibers.

Examples of light sources 110 include, for example and without limitation, laser diodes, light emitting diodes (LEDs), fluorescent bulbs, incandescent bulbs, and the like. By arranging the light-diffusing optical fibers 122 in the bundled portion 130 surrounding the light source 110, the capture performance of the light-diffusing optical fiber 122, calculated by comparing the light captured by the light-diffusing optical fiber 122 to the light emitted by the light source 110, may be enhanced. By increasing the capture performance of the light-diffusing optical fiber 122, an increased proportion of light emitted from the light source 110 is captured by the light-diffusing optical fiber 122 for transmission and diffusion to remote locations. The increase in capture performance of the light-diffusing optical fiber 122 also reduces a need to closely optically couple the light source 110 into the light-diffusing optical fiber 122. Instead, light may be emitted in a relatively diffuse manner and still be capture by the light-diffusing optical fiber 122. Embodiments of the lighting unit 100 having light-diffusing optical fiber 122 positioned to exhibit enhanced capture performance may therefore be used with light sources 110 that emit less-coherent light, including, for example LEDs. These light sources 110 may be lower cost as compared to light sources 110 that emit higher-coherence light, for example laser diodes.

In various embodiments of the lighting unit 100, the jacket 126 may be opaque, translucent, or transparent to light in the visible spectrum and/or to light emitted by the light source 110. In one embodiment in which the jacket 126 is transparent to light emitted by the light source 110, light may be diffused by the light-diffusing optical fibers 122 at locations proximate to the bundled portion 130 and at positions proximate to the splayed portion. In another embodiment in which the jacket 126 is generally opaque to the light emitted by the light source 110, the light is conveyed by the light-diffusing optical fibers 122 so that light that is diffused by the plurality of light-diffusing optical fibers 122 in the splayed portion, but generally not emitted into the environment at positions surrounding the bundled portion 130 of the plurality of light-diffusing optical fibers 122. In yet another embodiment, the jacket 126 may include a reflective surface 129 along the interior of the jacket 126 that reflects light emitted from the plurality of light-diffusing optical fibers 122 at positions within the bundled portion 130. By reflecting the light back onto the plurality of light-diffusing optical fibers 122, transmission loss of light evaluated along the length of the bundled portion 130 may be minimized such that the maximum intensity of light can be diffused by the light-diffusing optical fibers 122 in the splayed portion.

Figure 5:
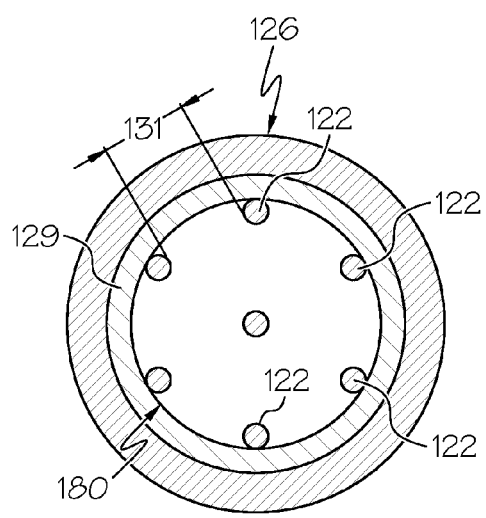
FIG. 5 schematically depicts a front sectional view of a light-diffusing optical fiber assembly shown along line B-B of FIG. 1 according to one or more embodiments shown or described herein.

Referring now to FIG. 5, the bundled packing ratio of the plurality of light-diffusing optical fibers 122 within the bundled portion 130 may be calculated by dividing the sum of the cross-sectional area of the plurality of light-diffusing optical fibers 122 by a bundled circumscribing diameter 180 that circumscribes all of the plurality of light-diffusing optical fibers 122. The bundled circumscribing diameter 180 may be evaluated at the minimum diameter of the plurality of light-diffusing optical fibers 122 in the bundled portion 130. In the embodiment depicted in FIG. 3, the bundled circumscribing diameter 180 generally corresponds to the internal diameter of the jacket 128. As depicted in FIG. 5, the plurality of light-diffusing optical fibers 122 within the bundled portion 130 may be positioned to be spaced apart from one another. In other embodiments (not shown), the plurality of light-diffusing optical fibers 122 may contact one another within the bundled portion 130. In one example, the lighting unit 100 may include seven light-diffusing optical fibers 122, six of which are generally arrayed around a center light-diffusing optical fiber 122. Each of the light-diffusing optical fibers 122 may be generally uniform in diameter, and have a diameter in a range from about 150 microns to about 200 microns. The light-diffusing optical fibers 122 may be arranged such that the bundled circumscribing diameter 180 in the bundled portion 130 is in a range from about 1 mm to about 4 mm.

In one example, the lighting unit 100 may include seven light-diffusing optical fibers 122, six of which are generally arrayed around a center light-diffusing optical fiber 122. Each of the light-diffusing optical fibers 122 may be generally uniform in diameter, and have a diameter in a range from about 150 microns to about 200 microns. The light-diffusing optical fibers 122 may be arranged such that the bundled circumscribing diameter 180 in the bundled portion 130 is in a range from about 1 mm to about 4 mm. In another example, the lighting unit 100 may include a plurality of light-diffusing optical fibers 122 in a range from about 2 to about 50 light-diffusing optical fibers 122, including being in a range from about 7 to about 37 light-diffusing optical fibers 122, including being in a range from about 19 to about 37 light-diffusing optical fibers 122. In some embodiments, the lighting unit 100 may include the plurality of light-diffusing optical fibers 122 positioned in the bundled portion 130, where a spacing distance 131 between adjacent light-diffusing optical fibers 122 is less than a maximum diameter of the adjacent light-diffusing optical fibers 122.

Figure 6:
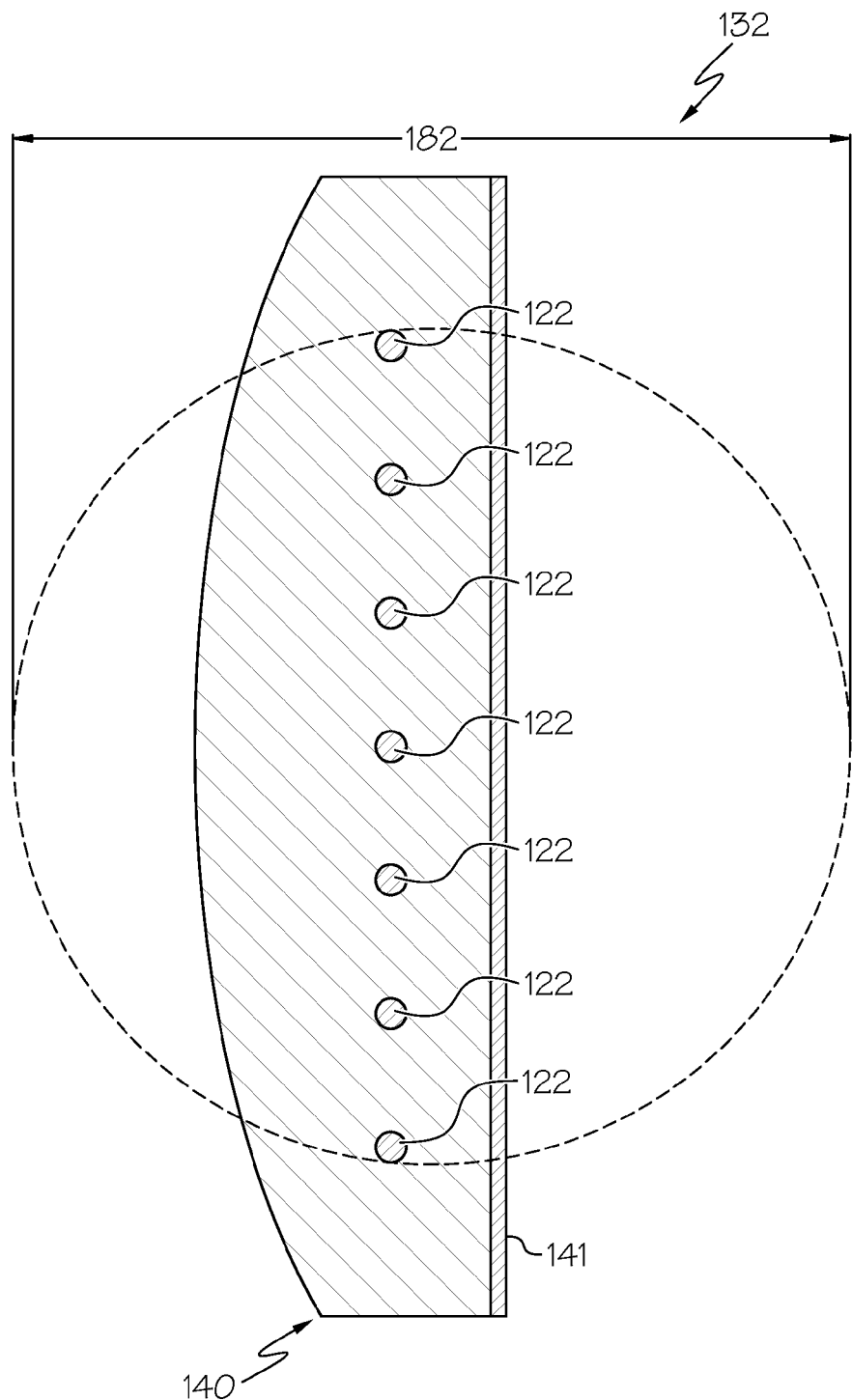
FIG. 6 schematically depicts a side sectional view of a lighting unit shown along line C-C of FIG. 1 according to one or more embodiments shown or described herein.

Referring now to FIG. 6, the plurality of light-diffusing optical fibers 122 positioned in the splayed portion 132 are structurally coupled to the support substrate 140. By structurally coupling the plurality of light-diffusing optical fibers 122 to the support substrate 140, the support substrate 140 maintains the position and orientation of the light-diffusing optical fibers 122. The support substrate 140, therefore, assists with maintaining the position of the light-diffusing optical fibers 122 to provide light to the surrounding environment.

The support substrate 140 may be made from a variety of materials that provide structural support for the plurality of light-diffusing optical fibers 122. Example of such materials including, for example and without limitation, glass, glass-ceramics, ceramics, crystals, plastic, metals, composites, natural materials such as wood, or combinations thereof. In some embodiments, the support substrate 140 may be translucent or transparent to the light diffused by the plurality of light-diffusing optical fibers 122 at pre-determined wavelengths, so that light diffused in the splayed portion 132 is cast into the surrounding environment. In some embodiments, the light diffused from the light-diffusing optical fibers 122 is reflected by one or more surfaces of the support substrate 140. In some embodiments, the light is reflected internally within the support substrate 140, thereby illuminating the support substrate 140, which directs light into the surrounding environment. In other embodiments, the light diffused from the light-diffusing optical fibers 122 is reflected by at least one reflecting member 141, which is attached to the support substrate 140, thereby illuminating the support substrate 140 and directing light into the surrounding environment.

In some embodiments, the support substrate 140 may be generally rigid, thereby maintaining the positioning of the light-diffusing optical fibers 122 relative to one another. Such support substrates 140 may be mounted in positions remote from the light source so that light emitted by the light source is diffused into the surrounding environment at positions spaced apart from the light source, as depicted in FIG. 1. In other embodiments, the support substrate 140 may be flexible so that the support substrate 140 will conform upon application of force. The support substrate 140 may be modified in shape to conform to an attachment surface to which the support substrate is mounted.

The splayed packing ratio of the plurality of light-diffusing optical fibers 122 within the splayed portion 132 may be calculated by dividing the sum of the cross-sectional area of the plurality of light-diffusing optical fibers 122 by a splayed circumscribing diameter 182 that circumscribes all of the plurality of light-diffusing optical fibers 122 within the splayed portion 132. The splayed circumscribing diameter 182 may be evaluated at a maximum diameter of the light-diffusing optical fibers 122 in the splayed portion 132. As depicted in FIG. 6 the plurality of light-diffusing optical fibers 122 within the splayed portion 132 may be positioned to be spaced apart from one another. In other embodiments (not shown), the plurality of light-diffusing optical fibers 122 may contact one another within the splayed portion 132.

In some embodiments, the lighting unit 100 may include the plurality of light-diffusing optical fibers 122 positioned in the splayed portion 132 having a splayed packing ratio less than about 0.333. In some embodiments, the lighting unit 100 may include the plurality of light-diffusing optical fibers 122 positioned in the bundled portion 130 having a bundled packing ratio greater than about 0.5.

Embodiments of the lighting units 100 may be configured with the plurality of light-diffusing optical fibers 122 arranged into a lower packing ratio in the splayed portion 132 as compared to the packing ratio in the bundled portion 130, as discussed above. In one embodiment, the splayed packing ratio may be at least 7 times the bundled packing ratio, including where the splayed packing ratio is at least 19 times the bundled packing ratio, including where the splayed packing ratio is at least 37 times the bundled packing ratio.

Figure 7:
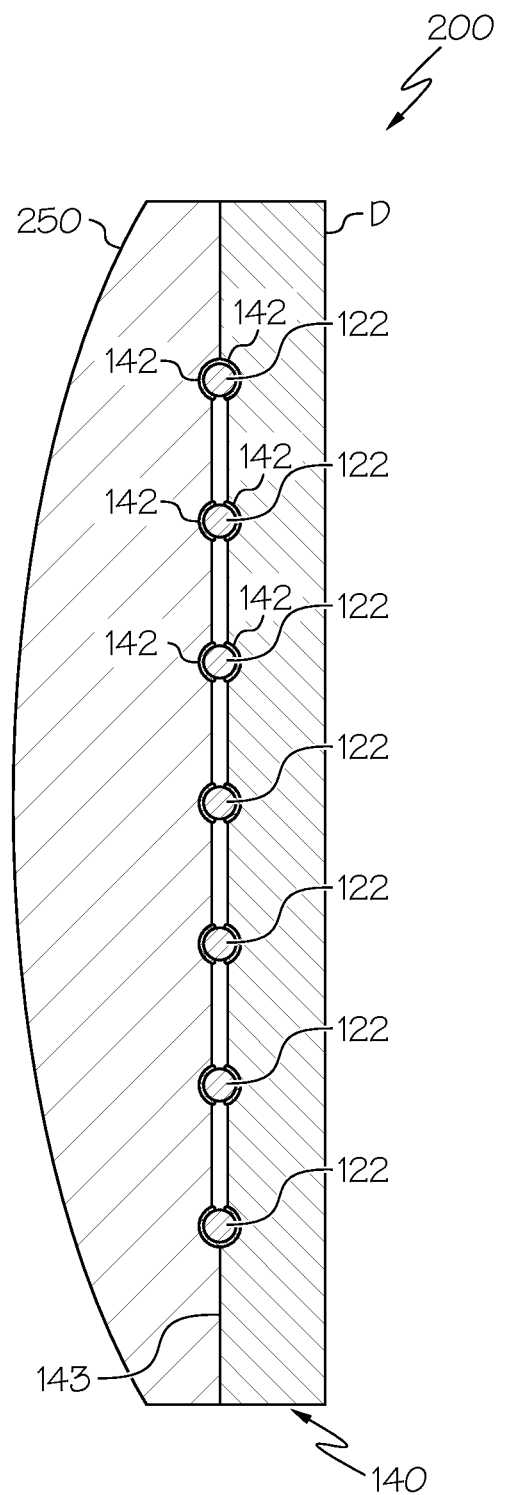
FIG. 7 schematically depicts a side sectional view of a lighting unit according to one or more embodiments shown or described herein.

Referring now to FIG. 7, one embodiment of a lighting unit 200 is depicted that includes a plurality of light-diffusing optical fibers 122, a support substrate 140, and a cover plate 250. The support substrate 140 and/or the cover plate 250 may include a plurality of retention grooves 142 that are debossed into a first surface 143 of the support substrate 140 and/or the cover plate 250. While the embodiment of FIG. 7 generally depicts the retention grooves 142 as being continuous along the length of the light-diffusing optical fibers 122, it should be understood that embodiments of the support substrate and/or the cover plate having interrupted retention grooves (not shown) may be incorporated into the lighting unit without departing from the scope of the present disclosure.

Figure 8:
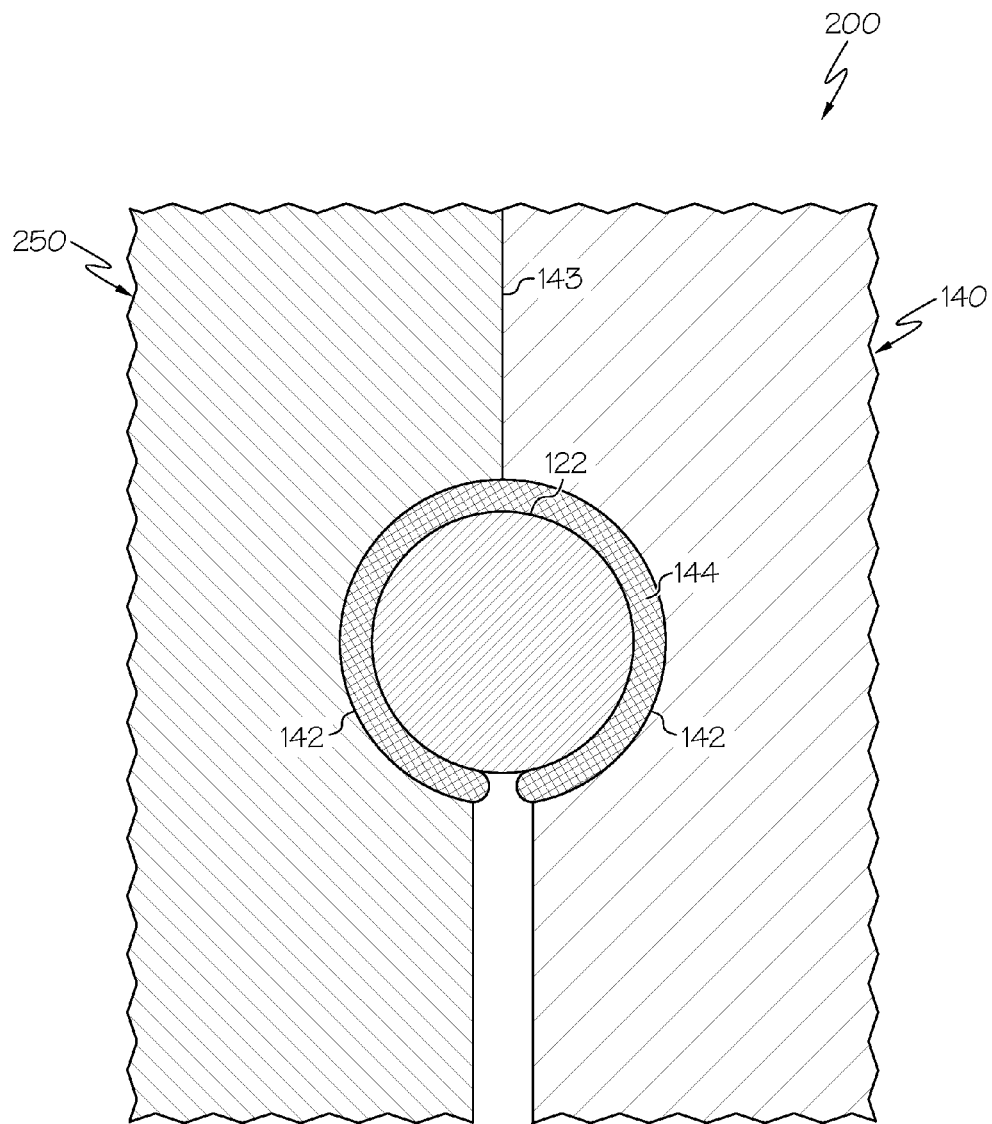
FIG. 8 schematically depicts a detailed side sectional view of a lighting unit shown at view D of FIG. 7 according to one or more embodiments shown or described herein.
Figure 9:
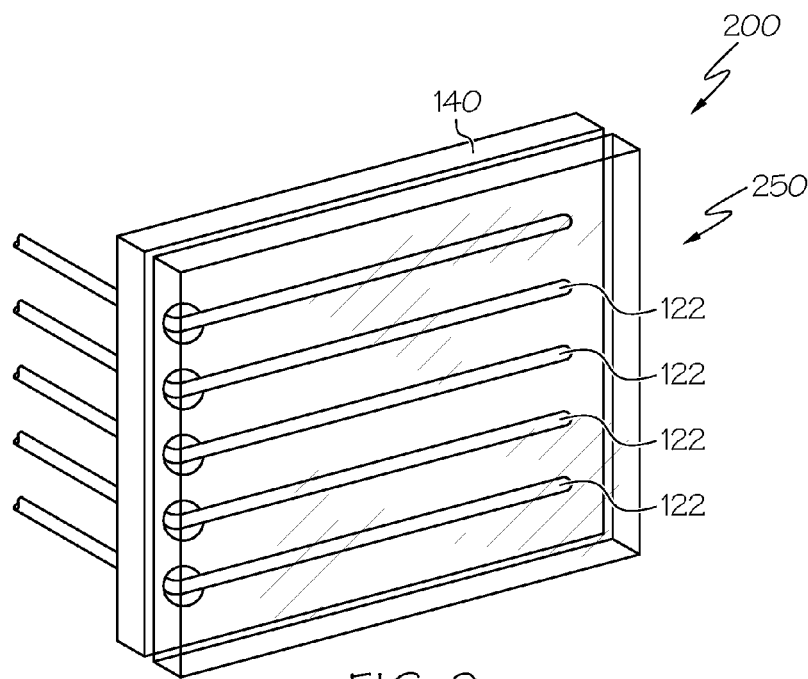
FIG. 9 schematically depicts a side perspective view of a portion of a lighting unit according to one or more embodiments shown or described herein.

Referring to FIG. 8, the plurality of light-diffusing optical fibers 122 may be coupled to the support substrate 140 and/or the cover plate 250 through the respective retention groove 142. In some embodiments, the plurality of light-diffusing optical fibers 122 may be coupled to the retention groove 142 with a bonding agent 144. Example bonding agents 144 include polymer-based glues, photo-curable polymers, and epoxy glues. The bonding agent 144 may resiliently couple the light-diffusing optical fiber 122 to the retention groove 142 of the support substrate 140 and/or the cover plate 250 so that the support substrate 140 and/or the cover plate 250 may be arranged in a variety of positions and orientations without the light-diffusing optical fiber 122 separating from the support substrate 140.

The bonding agent 144 may be index-matched to the light-diffusing optical fibers 122 and the support substrate 140 and/or the cover plate 250 to maximize light transmission from the light-diffusing optical fibers 122 into the support substrate 140 and/or the cover plate 250. The bonding agent 144 may have a refractive index $n_{144}$ similar to at least one of the refractive index $n_{122}$ of the light-diffusing optical fiber 122 or the refractive index $n_{140}$ of the support substrate 140 or the cover plate 250. In one embodiment, the refractive index $n_{144}$ of the bonding agent 144 may be between the refractive index $n_{122}$ of the light-diffusing optical fiber 122 and the refractive index $n_{140}$ of the support substrate 140, such that $n_{122} < n_{144} < n_{140}$.

As discussed hereinabove, embodiments of the lighting unit 100 may incorporate a cover plate 250 positioned opposite the support substrate 140 from the light-diffusing optical fiber 122. The cover plate 250 may diverge or concentrate the light scattered from the light-diffusing optical fiber 122 to modify the quality of light emitted by the lighting unit 100. Various embodiments of the cover plate may include a light shaping element 80 that modifies the light emitted by the light-diffusing optical fiber 122. A variety of configurations of cover plates having light shaping elements 80 may be incorporated into the lighting unit 100, examples of which are depicted in FIGS. 9-14.

Embodiments of the cover plate 250 may be transparent, translucent, opaque, or combinations thereof. The degree of opacity of the cover plate 250 may be determined by measuring the lumens of light input to the cover plate 250 and the lumens of light scattered by the cover plate 250. In one embodiment, the cover plate 250 may have a generally uniform opacity such that the opacity at any one location along the cover plate 250 varies less than or equal to about 10% of the median opacity across the cover plate 250. In some embodiments, the cover plate 250 may include a diverging lens that further defocuses light that is scattered from the light-diffusing optical fiber 1220. In some embodiments, the cover plate 250 may include a focusing lens that focuses light that is scattered from the light-diffusing optical fiber 122.

Figure 10:
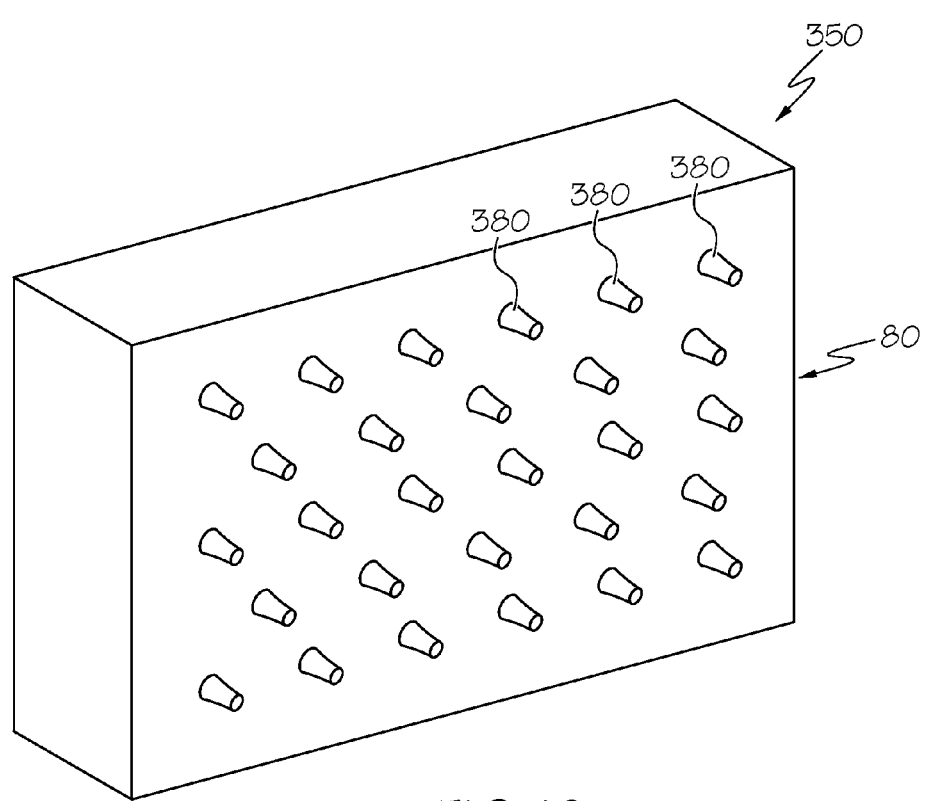
FIG. 10 schematically depicts a side perspective view of a cover plate for a lighting unit having a plurality of collimating elements according to one or more embodiments shown or described herein.

Referring now to FIG. 10, one example of a cover plate 350 having a plurality of collimating elements 380 is depicted. In the embodiment depicted in FIG. 10, the collimating elements 380 extend away from the cover plate 350 in orientations that project away from the light-diffusing optical fiber 122 (see FIG. 9). In other embodiments, the collimating elements 380 may be debossed into the cover plate (not shown). It should be understood that the collimating elements 380 may be positioned in a variety of orientations and configurations based on a particular end-user application. The collimating elements 380 may narrow the light scattered from the light-diffusing optical fiber so that a plurality of high-intensity regions of light (corresponding to the plurality of collimating elements 380) are directed from the lighting unit into the surrounding environment. The light emitted by the collimating elements 380 may be emitted in a pattern suited for the particular end-user application.

Figure 11:
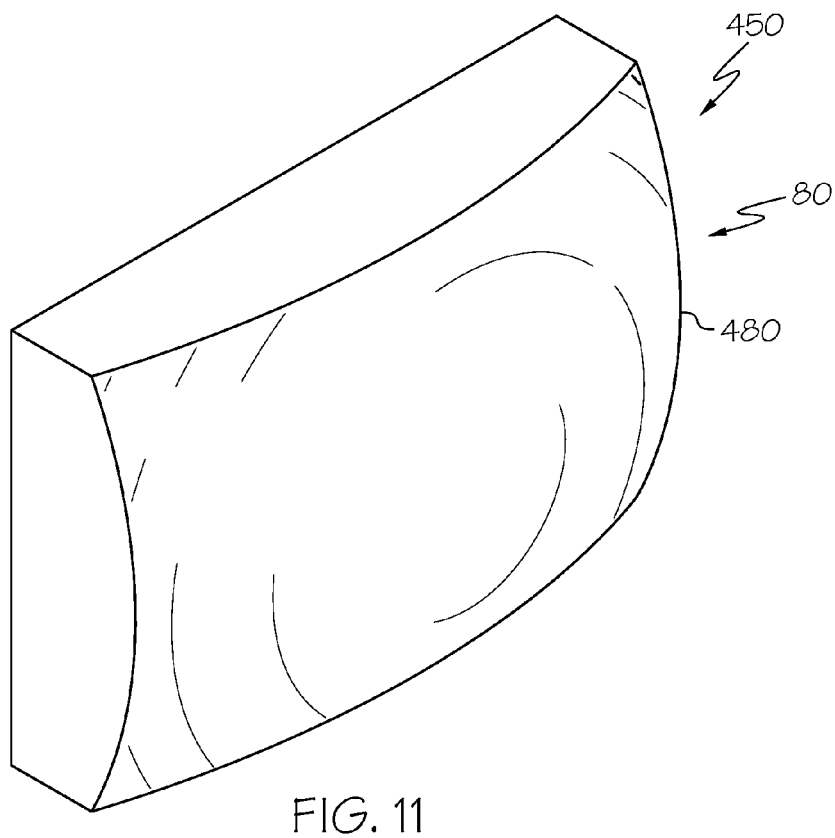
FIG. 11 schematically depicts a side perspective view of a cover plate for a lighting unit having a concentrating lens according to one or more embodiments shown or described herein.

Referring now to FIG. 11, another example of a cover plate 450 that incorporates a concentrating lens 480 is depicted. In this embodiment, light scattered from the light-diffusing optical fiber may be converged by the concentrating lens 480 such that the light that exits the cover plate 450 is focused at a position spaced apart from the cover plate 450.

Figure 12:
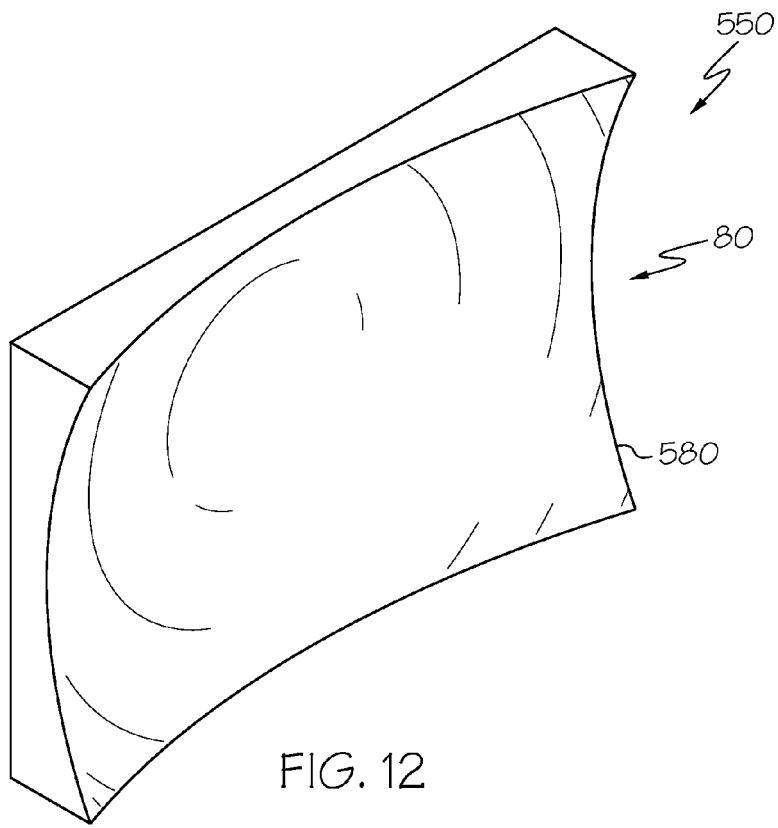
FIG. 12 schematically depicts a side perspective view of a cover plate for a lighting unit having a diverging lens according to one or more embodiments shown or described herein.

Referring now to FIG. 12, another example of a cover plate 550 that includes a diverging lens 580 is depicted. In this embodiment, light scattered from the light-diffusing optical fiber may be diverged by the diverging lens 580 such that the light that exits the cover plate 550 is defocused at positions spaced apart from the cover plate 550.

Figure 13:
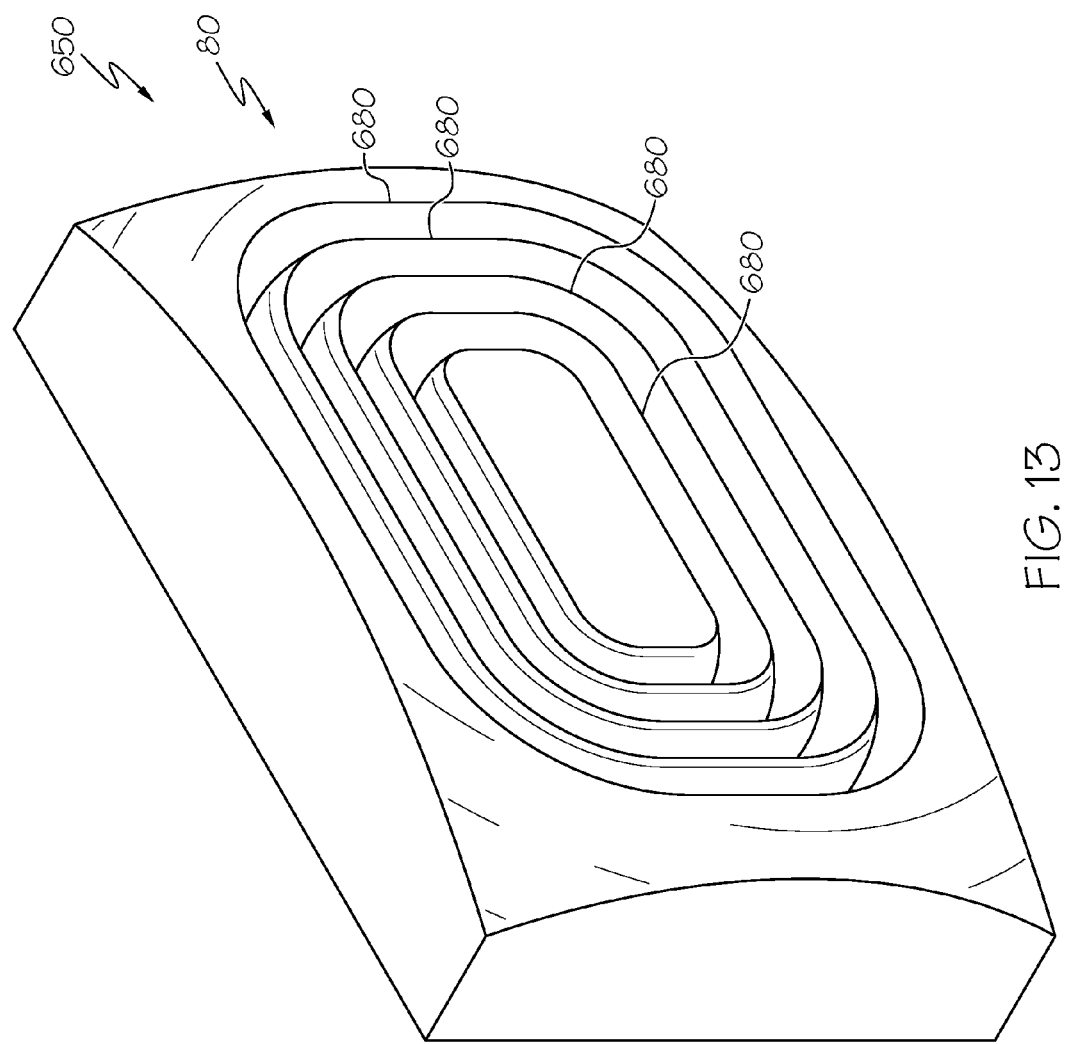
FIG. 13 schematically depicts a side perspective view of a cover plate for a lighting unit having a plurality of Fresnel elements according to one or more embodiments shown or described herein.

Referring now to FIG. 13, another example of a cover plate 650 that includes a plurality of Fresnel elements 680 is depicted. The Fresnel elements 680 may either focus or defocus the light that exits the cover plate 650. The cover plate 650 incorporating the plurality of Fresnel elements 680 may concentrate or diverge the light from the light-diffusing optical fiber a similar amount to cover plates 450, 550 depicted in FIGS. 11 and 12, respectively. However, the cover plate 650 having a plurality of Fresnel elements 680 may have a thinner profile than the cover plates 450, 550 depicted in FIGS. 11 and 12.

Figure 14:
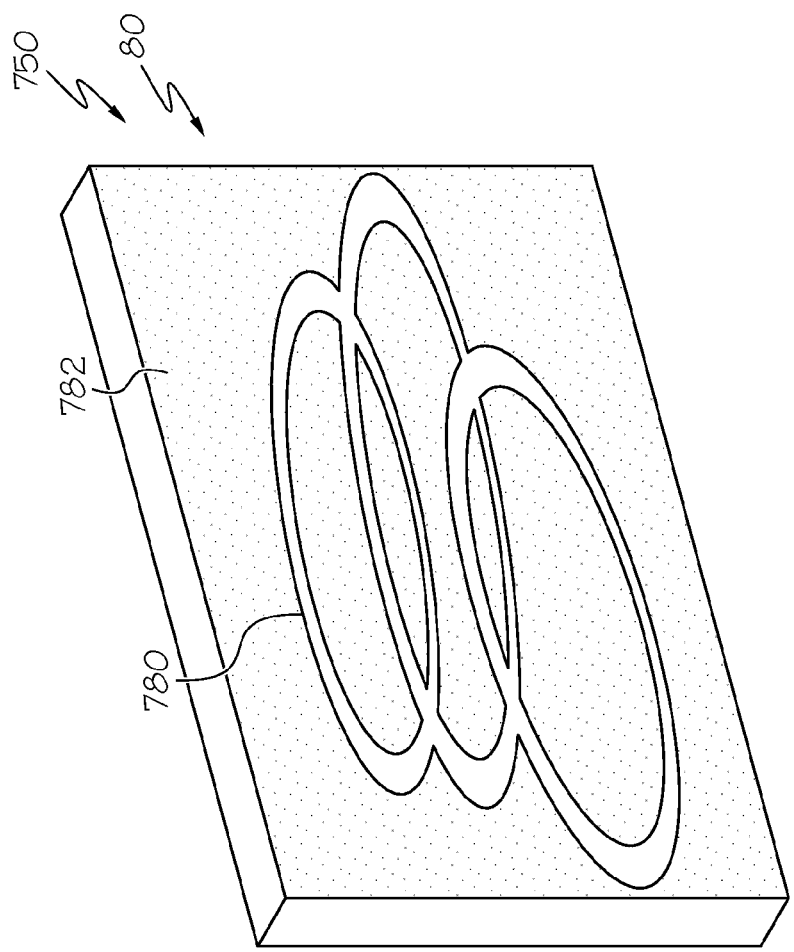
FIG. 14 schematically depicts a side perspective view of a cover plate for a lighting unit according to one or more embodiments shown or described herein.

Referring now to FIG. 14, the cover plate 750 may include a plurality of regions of high opacity 780 and a plurality of regions of low opacity 782 adjacent to the regions of high opacity 780. The regions of high opacity 780 and the regions of low opacity 782 of the cover plate 750 may modify the light scattered from the light-diffusing optical fiber into higher intensity regions and lower intensity regions, or may modify the color of the light scattered from the light-diffusing optical fiber. Additionally, the regions of high opacity 780 and the regions of low opacity 782 of the cover plate 750 may improve the aesthetics of the lighting unit to which the cover plate 750 is coupled.

Figure 15:
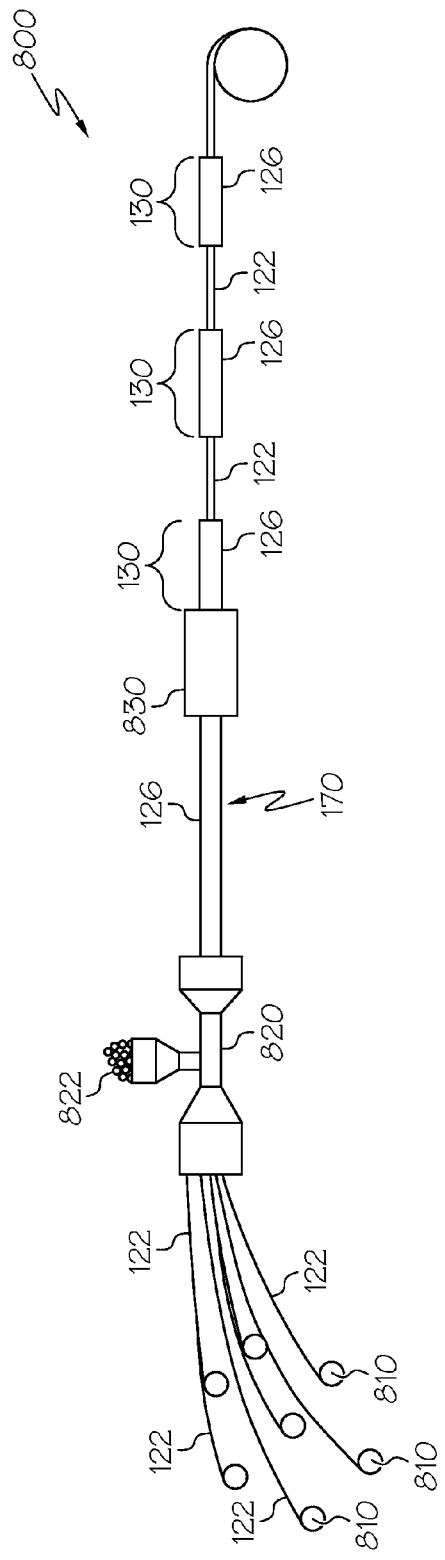
FIG. 15 schematically depicts a manufacturing apparatus for producing a lighting unit according to one or more embodiments shown or described herein.
Figure 16:
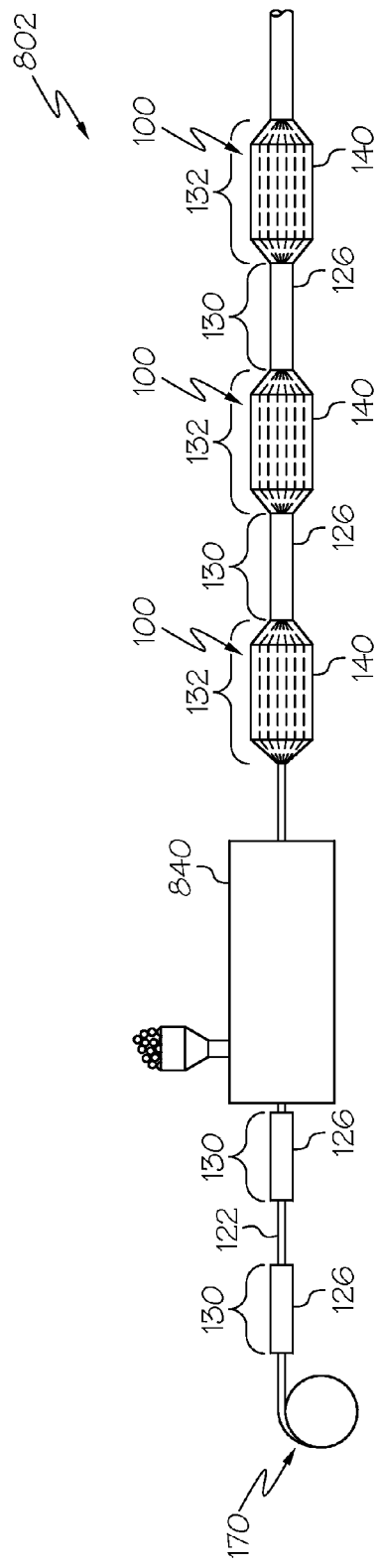
FIG. 16 schematically depicts a manufacturing apparatus for producing a lighting unit according to one or more embodiments shown or described herein.

Lighting units 100 according to the present disclosure may be manufactured according to a variety of manufacturing processes. Referring now to FIGS. 15 and 16, manufacturing apparatuses 800, 802 used in manufacturing the lighting units 100 are schematically depicted. In the depicted embodiment, the plurality of light-diffusing optical fibers 122 that are to be incorporated into the lighting unit 100 are individually positioned on feed wheels 810. The light-diffusing optical fibers 122 may be arranged into a pre-determined configuration and drawn into an injection molding machine 820 in which a polymer is injected around the light-diffusing optical fibers 122. As the polymer is cooled, the polymer solidifies, thereby forming the jacket 126. The plurality of light-diffusing optical fibers 122 are drawn continuously off of the feed wheels 810 and into the injection molding machine 820. In the depicted embodiment, the jacket 126 is formed continuously around the plurality of light-diffusing optical fibers 122, thereby forming an jacketed fiber assembly 170. The jacketed fiber assembly 170 may be introduced to a jacket removing apparatus 830 in which portions of the jacket 126 are removed from certain regions of the jacketed fiber assembly 170. By removing the jacket 126 in these regions, the light-diffusing optical fibers 122 can be exposed from the jacket 126, thereby allowing the light-diffusing optical fiber 122 to be oriented into the splayed portion, as discussed below.

Referring now to FIG. 16, the jacketed fiber assembly 170 containing bundled portions 130 around which the jacket 126 is present and portions in which the jacket has been removed from the jacketed fiber assembly 170, thereby exposing the plurality of light-diffusing optical fibers 122 is then introduced to a molding machine 840. The molding machine may include an injection molding apparatus that is capable of forming the support substrate. The portions of the light-diffusing optical fibers 122 that are exposed from the jacket 126 of the jacketed fiber assembly 170 may be held in a pre-determined orientation relative to one another and relative to the injection molding apparatus. With the exposed portions of the light-diffusing optical fibers 122 held in the pre-determined orientation, the injection molding apparatus may inject a liquid plastic material into a mold so that the liquid plastic material at least partially envelops portions of the light-diffusing optical fibers 122. As the liquid plastic material injected by the injection molding apparatus cools, the liquid plastic material solidifies, thereby forming the support substrate 140. The light-diffusing optical fiber assembly 120 that includes the light-diffusing optical fibers 122 that are arranged in the bundled portion 130 surrounded by the jacket 126 and in the splayed portion 132 embedded within the support substrate 140 is then removed from the injection molding apparatus.

Figure 17:
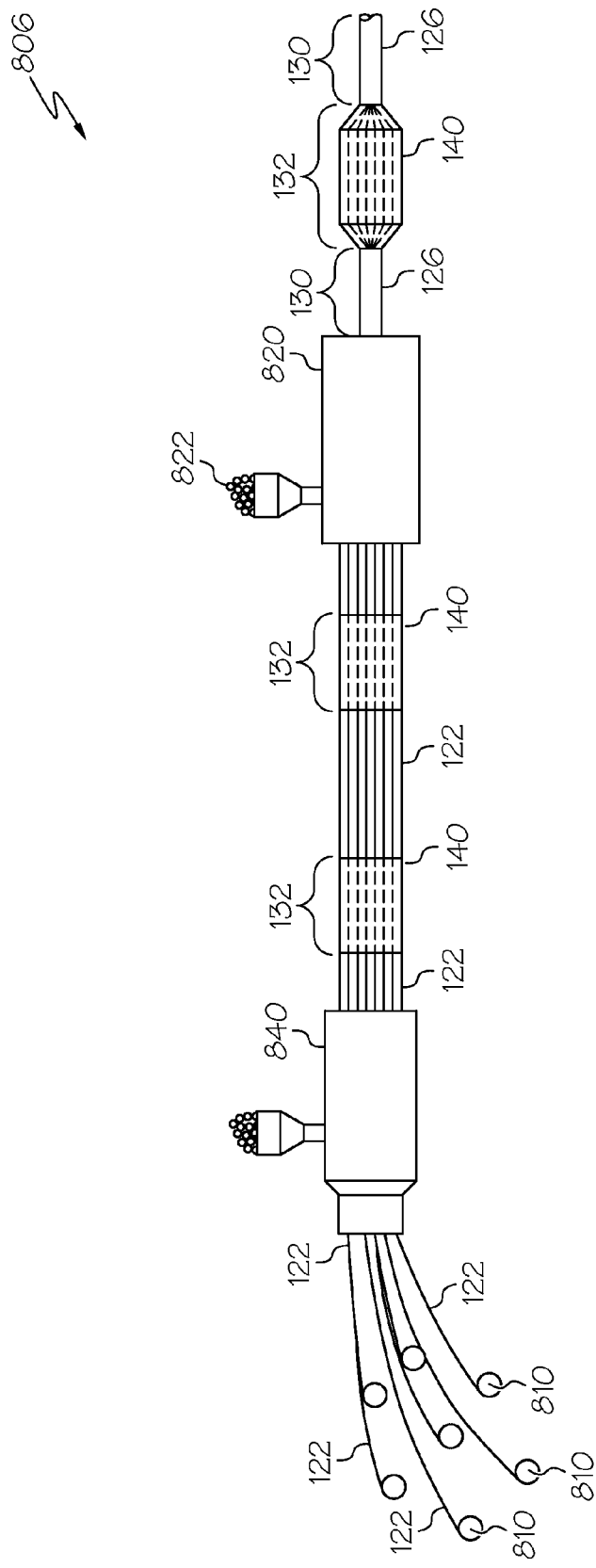
FIG. 17 schematically depicts a manufacturing apparatus for producing a lighting unit according to one or more embodiments shown or described herein.

Referring now to FIG. 17, another manufacturing process incorporated into another embodiment of the manufacturing apparatus 806 is depicted. In this embodiment, the plurality of light-diffusing optical fibers 122 are each positioned on feed wheels 810. The plurality of light-diffusing optical fibers 122 are drawn off of the feed wheels 810 and introduced to the molding machine 840. The light-diffusing optical fibers 122 are held in a pre-determined orientation relative to one another and relative to the molding machine 840. With the light-diffusing optical fibers 122 held in the pre-determined orientation, the molding machine 840 may inject a liquid plastic material into a mold so that the liquid plastic material at least partially surrounds portions of the light-diffusing optical fibers 122. As the liquid plastic material injected by the molding machine 840 cools, the liquid plastic material solidifies, thereby forming the support substrate 140. The light-diffusing optical fibers 122 positioned within the support substrate 140 define the splayed portion 132 of the light-diffusing optical fiber assembly.

Subsequent to formation of the support substrate 140, portions of the light-diffusing optical fibers 122 may be positioned relative to one another and covered with a plastic material 822 that forms the jacket 126 in the injection molding machine 820. The portion of the light-diffusing optical fibers 122 encapsulated by the jacket 126 defines the bundled portion 130 of the light-diffusing optical fibers 122.

While the discussion above of manufacturing processes discloses use of an injection molding apparatus to integrally form the support substrate around the splayed portion of the light-diffusing optical fibers, it should be understood that certain manufacturing processes may include positioning and attaching the light-diffusing optical fibers relative to the support substrate without an injection molding apparatus.

It should now be understood that lighting units according to the present disclosure may include a light source, a light-diffusing optical fiber assembly that includes a plurality of light-diffusing optical fibers that are arranged into a bundled portion and a splayed portion. The bundled portion is surrounded by a jacket. The splayed portion is free from the jacket. Light-diffusing optical fibers in the splayed portion are supported by a support substrate that maintains the positioning of the light-diffusing optical fibers. Light emitted by the light source is captured by the light-diffusing optical fibers, transmitted along the bundled portion to the splayed portion where the light is diffused into the surrounding environment. The lighting units according to the present disclosure allow for light to be delivered into the surrounding environment at positions spaced apart from the light source.

According to a first aspect, the disclosure provides a lighting unit comprising: a light source; a light-diffusing optical fiber assembly comprising a plurality of light-diffusing optical fibers that are arranged in a bundled portion surrounded by a jacket and a splayed portion free from the jacket, the plurality of light-diffusing optical fibers in the splayed portion scattering light optically coupled into the plurality of light-diffusing optical fibers from the light source; and a support substrate, wherein the plurality of light-diffusing optical fibers within the splayed portion are structurally coupled to the support substrate.

According to a second aspect, the disclosure provides a lighting unit comprising: a light source; a light-diffusing optical fiber assembly comprising a plurality of light-diffusing optical fibers that are arranged in a bundled portion and a splayed portion, the plurality of light-diffusing optical fibers in the splayed portion scattering light optically coupled into the plurality of light-diffusing optical fibers from the light source; and a support substrate, wherein at least a portion of the plurality of light-diffusing optical fibers within the splayed portion are embedded within the support substrate.

According to a third aspect, the disclosure provides a lighting unit comprising: a light source; and a light-diffusing optical fiber assembly comprising a plurality of light-diffusing optical fibers that are arranged in a bundled portion and a splayed portion, the plurality of light-diffusing optical fibers in the splayed portion scattering light optically coupled into the plurality of light-diffusing optical fibers from the light source; wherein a splayed packing ratio evaluated at a splayed circumscribing diameter that surrounds the light-diffusing optical fibers in the splayed portion comparing an area of the collective light-diffusing optical fibers to an area of the splayed circumscribing diameter is greater than a bundled packing ratio evaluated at a bundled diameter circumscribing the light-diffusing optical fibers in the bundled portion comparing the area of the collective light-diffusing optical fibers to an area of the bundled circumscribing diameter.

According to a fourth aspect, the disclosure provides the lighting unit of the first through third aspect, wherein the plurality of light-diffusing optical fibers within the splayed portion are embedded within the support substrate.

According to a fifth aspect, the disclosure provides the lighting unit of the fourth aspect wherein the light-diffusing optical fibers are bonded to the support substrate with a bonding agent that comprises an index-matching material having an index of refraction between an index of refraction of the support substrate and an index of refraction of the light-diffusing optical fibers.

According to a sixth aspect, the disclosure provides the lighting unit of the first through fifth aspects, wherein the support substrate comprises a plurality of retention grooves debossed into a first surface, at least a portion of the light-diffusing optical fibers coupled to the retention groove.

According to a seventh aspect, the disclosure provides the lighting unit of the first through sixth aspects, wherein the support substrate comprises a reflective surface that reflects light scattered by the plurality of light-diffusing optical fibers internally within the support substrate.

According to an eighth aspect, the disclosure provides the lighting unit of the first through seventh aspects, further comprising a cover plate positioned opposite the support substrate from the splayed portion of the light-diffusing optical fiber assembly.

According to a ninth aspect, the disclosure provides the lighting unit of the first through eighth aspects, further comprising a light shaping element.

According to a tenth aspect, the disclosure provides the lighting unit of the ninth aspect, wherein the light shaping element comprises a collimating element.

According to an eleventh aspect, the disclosure provides the lighting unit of the ninth aspect, wherein the light shaping element comprises a diverging lens.

According to a twelfth aspect, the disclosure provides the lighting unit of the ninth aspect, wherein the light shaping element comprises a concentrating lens.

According to a thirteenth aspect, the disclosure provides the lighting unit of the ninth aspect, wherein the light shaping element comprises a diffusing lens.

According to a fourteenth aspect, the disclosure provides the lighting unit of the ninth aspect, wherein the light shaping element comprises a cover plate comprising regions of high opacity positioned proximate to regions of low opacity.

According to a fifteenth aspect, the disclosure provides the lighting unit of the first through fourteenth aspects, wherein the support substrate comprises a material that is transmissive to light that is scattered from the light-diffusing optical fibers at a wavelength range of interest.

According to a sixteenth aspect, the disclosure provides the lighting unit of the first through fifteenth aspects, wherein the support substrate comprises a light modifying material having an index of refraction that differs from an index of refraction of the support substrate.

According to a seventeenth aspect, the disclosure provides the lighting unit of the first through sixteenth aspects, wherein the support substrate comprises a light modifying material that reflects light scattered from the light-diffusing optical fibers internally to the support substrate.

According to an eighteenth aspect, the disclosure provides the lighting unit of the first through seventeenth aspects, wherein the splayed packing ratio is at least seven times the bundled packing ratio.

According to a nineteenth aspect, the disclosure provides the lighting unit of the first through eighteenth aspects, wherein the splayed packing ratio is less than 0.333.

According to a twentieth aspect, the disclosure provides the lighting unit of the first through nineteenth aspects, wherein the bundled packing ratio is greater than 0.5.

According to a twenty-first aspect, the disclosure provides the lighting unit of the first through twentieth aspects, wherein a spacing distance between adjacent light-diffusing optical fibers in the bundled portion is less than a maximum diameter of the adjacent light-diffusing optical fibers.

According to a twenty-second aspect, the disclosure provides the lighting unit of the first through twenty-first aspects, further comprising a support substrate, wherein a portion of the light-diffusing optical fibers positioned in the splayed portion are embedded in the support substrate.

It is noted that the term "substantially" may be utilized herein to represent the inherent degree of uncertainty that may be attributed to any quantitative comparison, value, measurement, or other representation. This term is also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A lighting unit comprising:
a light source;
a light-diffusing optical fiber assembly comprising a plurality of light-diffusing optical fibers that are arranged in a bundled portion surrounded by a jacket and a splayed portion free from the jacket, the plurality of light-diffusing optical fibers in the splayed portion scattering light optically coupled into the plurality of light-diffusing optical fibers from the light source, each of said fibers comprising a core with a plurality of light scattering sites included therein; and
a support substrate, wherein the plurality of light-diffusing optical fibers within the splayed portion are structurally coupled to the support substrate.

2. The lighting unit of claim 1, wherein the plurality of light-diffusing optical fibers within the splayed portion are embedded within the support substrate.

3. The lighting unit of claim 2, wherein the light-diffusing optical fibers are bonded to the support substrate with a bonding agent that comprises an index-matching material having an index of refraction between an index of refraction of the support substrate and an index of refraction of the light-diffusing optical fibers.

4. The lighting unit of claim 1, wherein the support substrate comprises a plurality of retention grooves debossed into a first surface, at least a portion of the light-diffusing optical fibers coupled to the retention groove.

5. The lighting unit of claim 1, wherein the support substrate comprises a reflective surface that reflects light scattered by the plurality of light-diffusing optical fibers internally within the support substrate.

6. The lighting unit of claim 1, further comprising a cover plate positioned opposite the support substrate from the splayed portion of the light-diffusing optical fiber assembly.

7. The lighting unit of claim 1, further comprising a light shaping element.

8. A lighting unit comprising:
a light source;
a light-diffusing optical fiber assembly comprising a plurality of light-diffusing optical fibers that are arranged in a bundled portion surrounded by a jacket and a splayed portion free from the jacket, the plurality of light-diffusing optical fibers in the splayed portion scattering light optically coupled into the plurality of light-diffusing optical fibers from the light source; and
a support substrate, wherein the plurality of light-diffusing optical fibers within the splayed portion are structurally coupled to the support substrate further comprising a light shaping element, wherein the light shaping element comprises a collimating element.

9. A lighting unit comprising:
a light source;
a light-diffusing optical fiber assembly comprising a plurality of light-diffusing optical fibers that are arranged in a bundled portion surrounded by a jacket and a splayed portion free from the jacket, the plurality of light-diffusing optical fibers in the splayed portion scattering light optically coupled into the plurality of light-diffusing optical fibers from the light source; and
a support substrate, wherein the plurality of light-diffusing optical fibers within the splayed portion are structurally coupled to the support substrate further comprising a light shaping element, further comprising a light shaping element, wherein the light shaping element comprises a diverging lens.

10. A lighting unit comprising:
a light source;
a light-diffusing optical fiber assembly comprising a plurality of light-diffusing optical fibers that are arranged in a bundled portion surrounded by a jacket and a splayed portion free from the jacket, the plurality of light-diffusing optical fibers in the splayed portion scattering light optically coupled into the plurality of light-diffusing optical fibers from the light source; and
a support substrate, wherein the plurality of light-diffusing optical fibers within the splayed portion are structurally coupled to the support substrate further comprising a light shaping element, further comprising a light shaping element wherein the light shaping element comprises a concentrating lens.

11. A lighting unit comprising:
a light source;
a light-diffusing optical fiber assembly comprising a plurality of light-diffusing optical fibers that are arranged in a bundled portion surrounded by a jacket and a splayed portion free from the jacket, the plurality of light-diffusing optical fibers in the splayed portion scattering light optically coupled into the plurality of light-diffusing optical fibers from the light source; and a support substrate, wherein the plurality of light-diffusing optical fibers within the splayed portion are structurally coupled to the support substrate; and a light shaping element, wherein the light shaping element comprises a diffusing lens.

12. The lighting unit of claim 7, wherein the light shaping element comprises a cover plate comprising regions of high opacity positioned proximate to regions of low opacity.

13. A lighting unit comprising:
a light source;
a light-diffusing optical fiber assembly comprising a plurality of light-diffusing optical fibers that are arranged in a bundled portion and a splayed portion, the plurality of light-diffusing optical fibers in the splayed portion scattering light optically coupled into the plurality of light-diffusing optical fibers from the light source, said light-diffusing optical fibers comprising a light scattering region, the light scattering region including a light scattering material, said light scattering material comprising at least one of: a solid particle, a liquid droplet, or a gas bubble, or combination thereof, sized to scatter light propagating through said fiber region; and
a support substrate, wherein at least a portion of the plurality of light-diffusing optical fibers within the splayed portion are embedded within the support substrate.

14. The lighting unit of claim 13, wherein the support substrate comprises a material that is transmissive to light that is scattered from the light-diffusing optical fibers at a wavelength range of interest.

15. The lighting unit of claim 13, wherein the support substrate comprises a light shaping element that has optical power.

16. A lighting unit comprising;
a light source;
a light-diffusing optical fiber assembly comprising a plurality of light-diffusing optical fibers that are arranged in a bundled portion and a splayed portion, the plurality of light-diffusing optical fibers in the splayed portion scattering light optically coupled into the plurality of light-diffusing optical fibers from the light source; and
a support substrate comprising a light shaping element, wherein at least a portion of the plurality of light-diffusing optical fibers within the splayed portion are embedded within the support substrate, wherein the light shaping element comprises at least one of a collimating element, a diverging lens, a concentrating lens, or a diffusing lens.

17. The lighting unit of claim 13, wherein the support substrate comprises light modifying material having an index of refraction that differs from an index of refraction of the support substrate.

18. The lighting unit of claim 13, wherein the support substrate comprises a light modifying material such that light scattered from the light-diffusing optical fibers reflects internally to within the support substrate.

19. A lighting unit comprising:
a light source; and
a light-diffusing optical fiber assembly comprising a plurality of light-diffusing optical fibers that are arranged in a bundled portion and a splayed portion, said light-diffusing optical fibers each having a core with a plurality of light scatterers, the plurality of light-diffusing optical fibers in the splayed portion scattering light optically coupled into the plurality of light-diffusing optical fibers from the light source;

wherein a splayed packing ratio evaluated at a splayed circumscribing diameter that surrounds the light-diffusing optical fibers in the splayed portion comparing an area of the collective light-diffusing optical fibers to an area of the splayed circumscribing diameter is greater than a bundled packing ratio evaluated at a bundled diameter circumscribing the light-diffusing optical fibers in the bundled portion comparing the area of the collective light-diffusing optical fibers to an area of the bundled circumscribing diameter.

20. The lighting unit of claim 19, wherein the splayed packing ratio is at least seven times the bundled packing ratio.

21. The lighting unit of claim 19, wherein the splayed packing ratio is less than 0.333.

22. The lighting unit of claim 19, wherein the bundled packing ratio is greater than 0.5.

23. The lighting unit of claim 19, wherein a spacing distance between adjacent light-diffusing optical fibers in the bundled portion is less than a maximum diameter of the adjacent light-diffusing optical fibers.

24. The lighting unit of claim 19, further comprising a support substrate, wherein a portion of the light-diffusing optical fibers positioned in the splayed portion are embedded in the support substrate.

25. The lighting unit of claim 1, wherein said plurality of light scattering sites within the cores of said light-diffusing optical fibers are voids.

26. The lighting unit of claim 1, wherein the plurality scattering sites within the cores of said light-diffusing optical fibers are voids, and at least some of said light-diffusing optical fibers further comprise a light scattering layer surrounding the fiber core, the light scattering layer comprising a light scattering material.

27. The lighting unit of claim 26, said scattering layers of said light-diffusing optical fibers comprise at least one of: a solid particle, a liquid droplet, or a gas bubble, or combination thereof, sized to scatter light.

28. A lighting unit comprising:
a light source;
a light-diffusing optical fiber assembly comprising a plurality of light-diffusing optical fibers that are arranged in a bundled portion surrounded by a jacket and a splayed portion free from the jacket, said light-diffusing optical fibers further comprising a light scattering layer, the light scattering layer comprising a light scattering material, said light scattering material comprising at least one of: a solid particle, a liquid droplet, or a gas bubble, or combination thereof, sized to scatter light propagating through said layer,
the plurality of light-diffusing optical fibers in the splayed portion scattering light optically coupled into the plurality of light-diffusing optical fibers from the light source; and
a support substrate, wherein the plurality of light-diffusing optical fibers within the splayed portion are structurally coupled to the support substrate.

29. A lighting unit according to claim 28, wherein said light diffusing fiber includes a core, a cladding said light scattering layer surrounds said cladding.

30. The lighting unit of claim 28, wherein said scattering layer of said light-diffusing optical fibers comprise phosphor materials.

31. The lighting unit of claim 28, further comprising a light shaping element.

32. The lighting unit of claim 28, further comprising a light shaping element with optical power, wherein the light shaping element comprises a collimating element.

33. The lighting unit of claim 28, further comprising a light shaping element with optical power wherein the light shaping element comprises a diverging lens.

34. The lighting unit of claim 28, further comprising a light shaping element with optical power wherein the light shaping element comprises a concentrating lens.

35. The lighting unit of claim 28, wherein the light shaping element comprises a cover plate comprising regions of high opacity positioned proximate to regions of low opacity.

36. The lighting unit of claim 28, wherein the light shaping element comprises a cover plate of substantially uniform thickness comprising regions of high opacity positioned proximate to regions of low opacity.

37. The lighting unit of claim 28, wherein the light shaping element comprises a light diffusing cover.

* * * * *